2,890,216
MONOAZO-DYESTUFFS INSOLUBLE IN WATER

Ernst Fischer, Offenbach, Germany, assignor to Farbwerke Hoechst Aktiengesellschaft, vormals Meister Lucius & Brüning, Frankfurt am Main, Germany, a corporation of Germany No Drawing. Application April 17, 1957
Serial No. 653,304

Claims priority, application Germany April 28, 1956

3 Claims. (Cl. 260—193)

The present invention relates to new monoazo-dyestuffs insoluble in water and to a process for preparing them; more particularly it relates to dyestuffs which correspond to the following general formula:

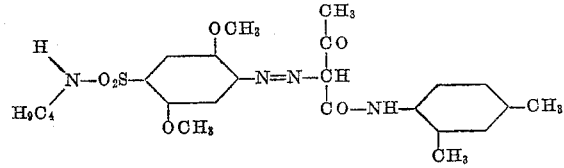

I have found that valuable monoazo-dyestuffs insoluble in water are obtained by coupling the diazonium compound of a 1-amino-2,5-dimethoxybenzene-4-sulfonic acid-butylamide with 1-acetoacetylamino-2,4-dimethylbenzene.

The dyestuffs prepared in substance in the manner described above are suitable for the preparation of color lakes which are fast to oil and to light. The are also suitable for the production of colored films by incorporating them in compositions containing cellulose esters or cellulose ethers. They can likewise be used for coloring natural and artificial resins, such as the condensation products of formaldehyde with urea, phenols or amines, and also for coloring rubber and polyvinyl compounds. Furthermore, the new dyestuffs can be applied to textile materials by padding or printing in the presence of binding agents and they can also be used for the production of spun-dyed acetate rayon and viscose rayon by incorporating them in the spinning solutions.

The new dyestuffs yield greenish yellow shades and, owing to their strongly transparent character, they are especially suitable for the printing ink industry, since the number of yellow dyestuffs with a strongly greenish and transparent tint was, hitherto, relatively limited.

As compared with the dyestuff from diazotized 1-amino-2,5-dimethoxybenzene-4-sulfonic acid-n-butylamide and 1-acetoacetylamino-2,5-dimethoxy-4-chlorobenzene, described in German Patent No. 904,886, the new dyestuffs are distinctly superior with regard to their transparency, the greenish hue and the brightness of the tint, and also with regard to the fastness to overspraying of the nitrocellulose lacquer colorations.

The following example serves to illustrate the invention but it is not intended to limit it thereto, the parts being by weight:

Example 14.4 parts of 1-amino-2,5-dimethoxybenzene-4-sulfonic acid-n-butylamide are diazotized in the usual manner. In order to remove the excess of mineral acid sodium acetate is added to the diazo-solution which is then stirred into an aqueous suspension of 10.3 parts of 1-acetoacetylamino-2,4-dimethylbenzene, the suspension being prepared by dissolving the latter compound in dilute caustic soda solution and precipitating it with acetic acid. When the coupling is complete, the dyestuff so obtained is filtered off, washed well and dried. It is a yellow powder. The lakes prepared with this dyestuff are colored with a strongly greenish hue and possess a high transparency and a good fastness to light.

The coupling can also be conducted in the presence of a substratum adapted for the production of color lakes.

By using in the above example instead of 14.4 parts of 1-amino-2,5-dimethoxybenzene-4-sulfonic acid-n-butylamide the same amount of 1-amino-2,5-dimethoxybenzene-4-sulfonic acid-iso-butylamide, a yellow dyestuff is obtained which can be used for the production of a pigment print on textile materials by one of the usual methods, for example by using an emulsion of polyvinyl acetate and the water-soluble condensation products of urea and formaldehyde. The print so obtained has a greenish yellow tint and possesses good properties of fastness, especially a good fastness to wet processing.

I claim:

1. The monoazo-dyestuffs insoluble in water corresponding to the following formula

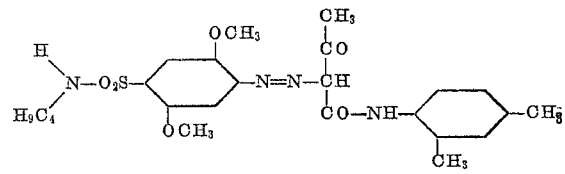

2. The monoazo-dyestuff insoluble in water corresponding to the following formula

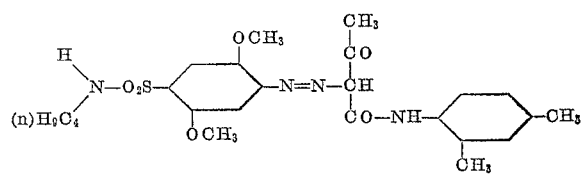

3. The monoazo-dyestuff insoluble in water corresponding to the following formula

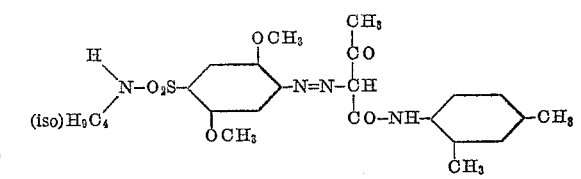

References Cited in the file of this patent

UNITED STATES PATENTS

| | | |
|---|---|---|
| 2,112,764 | Dahlen et al. | Mar. 29, 1938 |
| 2,729,632 | Fischer et al. | Jan. 3, 1956 |

FOREIGN PATENTS

| | | |
|---|---|---|
| 904,886 | Germany | Feb. 22, 1954 |